United States Patent [19]

Itoh

[11] 4,408,232
[45] Oct. 4, 1983

[54] IMAGE READING DEVICE
[75] Inventor: Satoru Itoh, Kanagawa, Japan
[73] Assignee: Fuji Xerox Co., Ltd., Tokyo, Japan
[21] Appl. No.: 298,144
[22] Filed: Aug. 31, 1981
[30] Foreign Application Priority Data
  Sep. 9, 1980 [JP] Japan .............................. 55-124049
[51] Int. Cl.³ ........................................... H04M 1/40
[52] U.S. Cl. .................................... 358/280; 358/264
[58] Field of Search ................ 358/280, 283, 264, 267
[56] References Cited
U.S. PATENT DOCUMENTS
  4,208,677  6/1980  Schayes et al. ...................... 358/280

Primary Examiner—Robert L. Griffin
Assistant Examiner—Edward L. Coles
Attorney, Agent, or Firm—Sughrue, Mion, Zinn, Macpeak and Seas

[57]  ABSTRACT

An image reading device in which a reference image is outputted together with original data to form a first recorded image and the first recorded image is again read as original data with a reading window of a reading device maintained in phase with the reference image. A sampling pulse signal is produced in phase with a reference line provided on the original image. An analog image signal representing the original image is quantized into a binary electrical signal and stored in a register, wherein, the conversion of the analog image signal into the binary electrical signal occurs after the sampling pulse signal is set in phase with the reference line. A circuit for controlling the scanning of the original image is also disclosed.

5 Claims, 13 Drawing Figures

IMAGE READING DEVICE

BACKGROUND OF THE INVENTION

The present invention relates to image reading devices in which an original document is scanned to convert the data on the original into an electrical signal. More particularly, the invention relates to an image reading device of the type in which data on an original is geometrically sampled to produce an electrical signal representative thereof.

Most so-called "image reading devices" in which data on an original is converted into electrical signals, employ a method in which a small circular or rectangular window is used to scan the surface of an original to obtain an electrical signal, the level of which is proportional to the density of the part of the original appearing in the window. The image data read by the reading device is converted into an electrical signal which is recorded by a recording device and is then reproduced to obtain a visible image. In the recording device, similar to the reading device, recording is carried out by using a small circular or rectangular window. Unfortunately, this system suffers from a drawback in that a recorded image may be of low quality due to the position of the recording window being shifted in phase from that of the reading window of the reading device.

SUMMARY OF THE INVENTION

Accordingly, an object of the invention is to provide an image reading device in which this difficulty is overcome and the resultant image is satisfactory in image quality.

In accordance with this and other objects, the invention provides an image recording device in which a reference image is outputted together with original data to form a first recorded image, and in reading the first recorded image as an original again the original data is read with the reading window of the reading device set in phase with the reference image.

DESCRIPTION OF THE PREFERRED EMBODIMENTS

Figure 1:
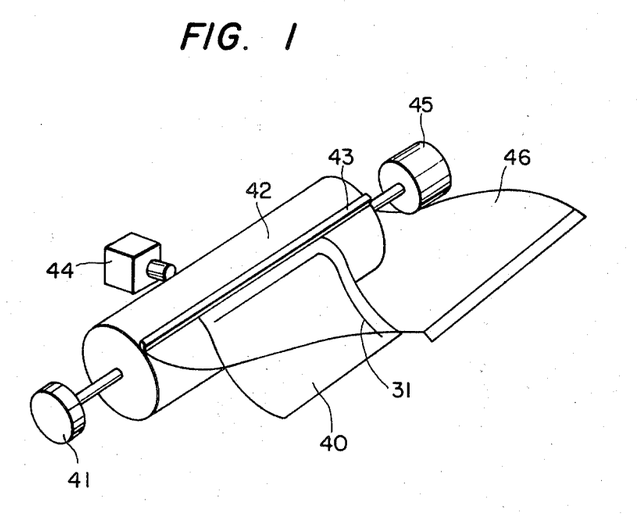
FIG. 1 is a schematic diagram showing the arrangement of an image reading device to which the invention is applied.

FIG. 1 is a schematic diagram showing the arrangement of an image reading device to which the invention is applied. In FIG. 1, reference numeral 40 designates an original document or image, 41 a rotary encoder, 42 a drum, 43 a stop, 44 a photoelectric conversion unit, 45 an electric motor, 46 a transparent cover and 31 a reference line on the original.

In reading the original 40 by scanning with the photoelectric conversion unit 44, the front edge of the original is abutted against the stop 43 provided on the drum 42. Under this condition, the original 40 is wound onto the drum 42. Then, the drum 42 is turned intermittently while the photoelectric conversion unit 44 is reciprocated horizontally to thus scan and read the original 40.

Figure 2:
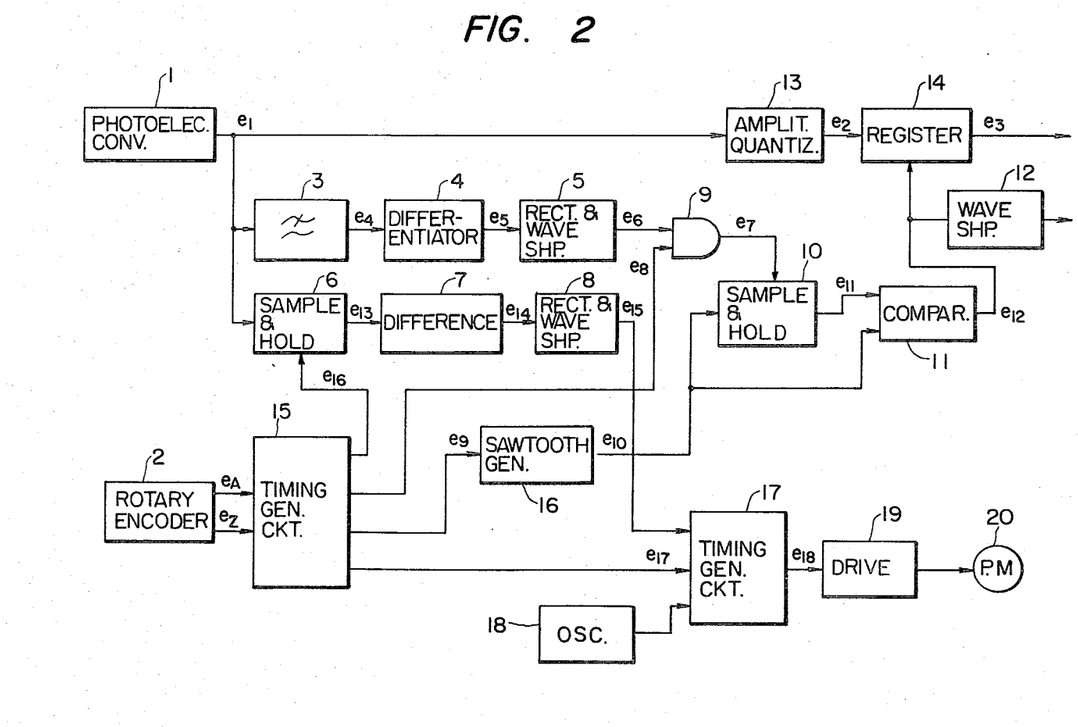
FIG. 2 is a block diagram showing a preferred embodiment of an image reading device of the invention.
Figure 3A:
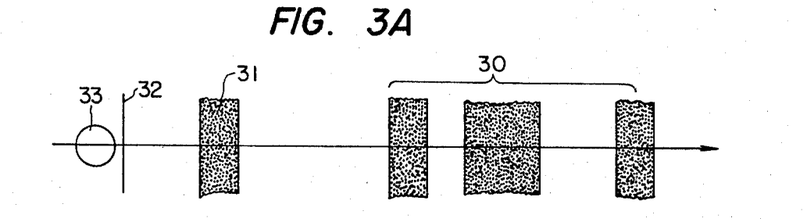
FIG. 3A is an enlarged view of a part of an original.
Figure 3B:
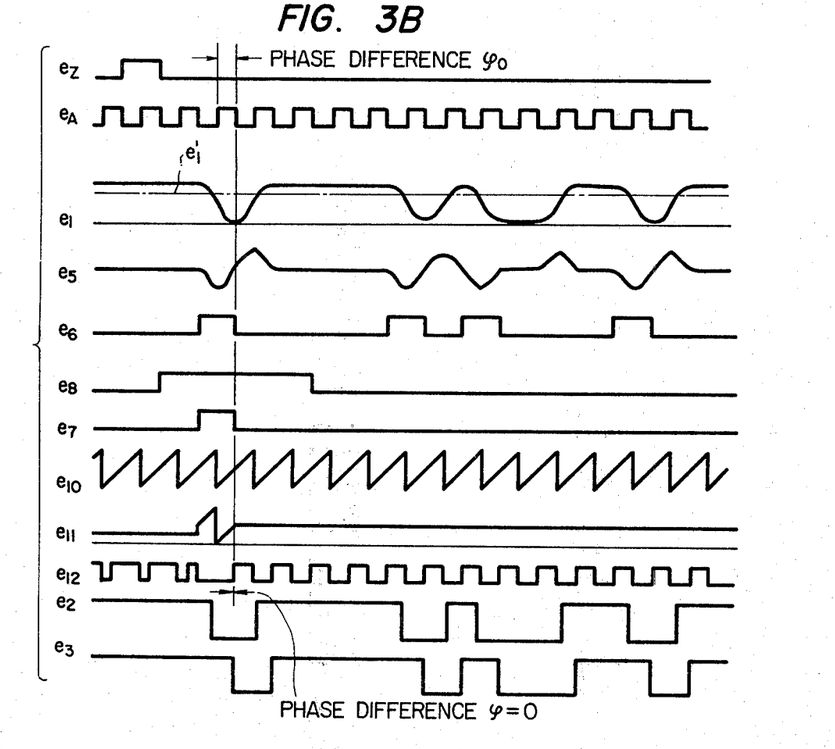
FIG. 3B is a waveform diagram showing signals at various circuit points in FIG. 2.
Figure 3C:
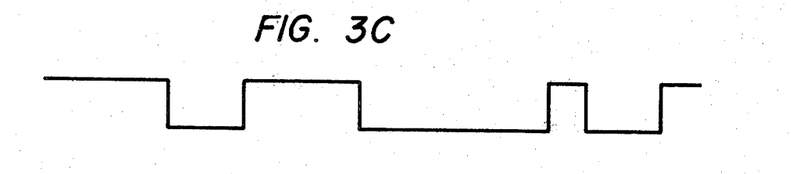
FIG. 3C is a waveform diagram showing a signal of an image which is recorded according to a conventional image recording system.
Figure 4A:
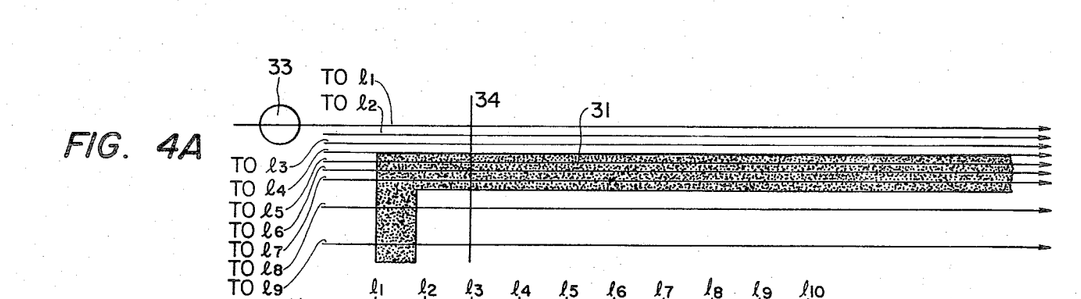
FIG. 4A is an enlarged view of another part of the original.
Figure 4B:
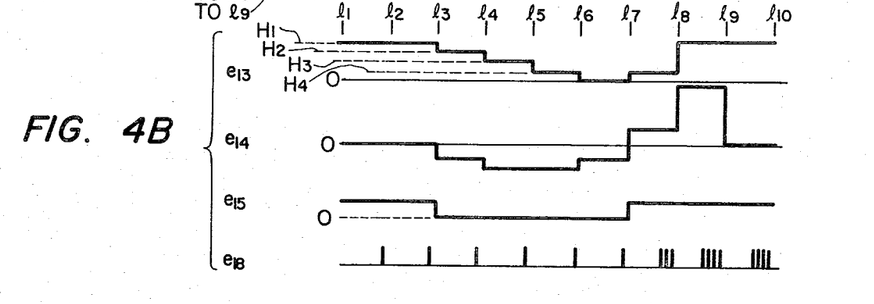
FIG. 4B is a waveform diagram showing signals at various circuit points in FIG. 2.

FIG. 2 is a block diagram of a preferred embodiment of the image reading device of the invention. FIGS. 3 and 4 show voltage waveforms at various circuit points thereof. The preferred embodiment will be described with reference to these figures.

In FIG. 2, reference numeral 1 designates a photoelectric conversion unit, 2 a rotary encoder, 3 an LPF (low-pass filter), 4 a differentiator circuit, 5 a half-wave rectifying and waveform shaping circuit, 6 a sample-and-hold circuit, 7 a difference circuit, 8 a half-wave rectifying and waveform shaping circuit, 9 an AND gate, 10 a sample-and-hold circuit, 11 a voltage comparison circuit, 12 a waveform shaping circuit, 13 an amplitude quantizing circuit, 14 a register, 15 a timing circuit, 16 a sawtooth-wave generating circuit, 17 a timing circuit, 18 an oscillator, 19 a drive circuit, and 20 a pluse motor.

FIG. 3A shows relationships between a reading window 33 and data on the original in the main scanning direction in an original reading operation. FIG. 3B shows voltage waveforms at various points in the circuit of FIG. 2 in the original reading operation.

The operation of this circuit in reading the original in the main scanning direction will be described. FIG. 3A shows a part of the image which is recorded by a recording device. The image is then read, again as an original, by the reading device. The recording image has data 30 on the original (hereinafter referred to "original data 30") and the reference line 31. In the FIG. 3A, reference numeral 32 designates the front edge of a sheet and 33 the reading window of the reading device.

In FIG. 3B, reference characters $e_Z$ and $e_A$ designate the outputs of the rotary encoder 2. More specifically, the output $e_Z$ is a reference pulse which is produced while the reading window 33 detects the front edge 32 of the sheet, and the output $e_A$ is an output pulse. The photoelectric conversion unit 1 reads through the reading window 33 the reference line 31 and the original data 30 in the main scanning direction (in the direction of the arrow in FIG. 3A). The data thus read is converted into an electrical signal, that is, an analog image output having a waveform as indicated as $e_1$ in FIG. 3B.

In this connection, a one-dot chain line $e_1'$ shows the threshold value of the amplitude quantizing circuit. The signal $e_1$ is applied through the LPF 3 to the differentiator circuit 4 where it is subjected to differentiation, as a result of which is differentiation signal $e_5$ is produced. The signal $e_5$ is subjected to half-wave rectification and waveform shaping in the circuit 5 as a result of which a signal $e_6$ is outputted by the circuit 5.

The timing circuit outputs a pulse signal $e_8$ which rises in synchronization with the fall of the reference signal $e_Z$ and falls after at least the reading window passes through the reference line 31. The signal $e_8$ is applied to one of the input terminals of the AND gate 9. Thereafter, the signal $e_6$ passes through the AND gate 9 and is outputted as a signal $e_7$ therefrom. The signal $e_7$ is applied to the sample-and-hold circuit 10. In the sample-and-hold circuit 10, a sawtooth-wave signal $e_{10}$ from the sawtooth-wave generating circuit 16 is sampled and held with the signal $e_7$. The sawtooth-wave signal $e_{10}$ is formed from the output pulse $e_A$. The sample-and-hold circuit 10 outputs a signal $e_{11}$. The signals $e_{10}$ and $e_{11}$ are applied to the voltage comparison circuit 11 which in turn outputs a register strobe (or sampling pulse) $e_{12}$. Upon provision of the register strobe, the phase difference $\psi$ between the register strobe $e_{12}$ and the image signal $e_1$ is zeroed.

The analog image signal $e_1$ outputted by the photoelectric conversion unit 1 is quantized into a signal $e_2$ by the amplitude quantizing circuit 13. The signal $e_2$ is supplied to the register 14 where it is sampled by the register strobe $e_{12}$. A a result, a digital image signal $e_3$ is formed, the signal $e_3$ being in phase with the register strobe $e_{12}$.

Heretofore, an output pulse $e_A$ as shown in FIG. 3B was employed as a register strobe (or a sampling pulse) thus leading to a phase difference $\psi_0$ between the output pulse $e_A$ and the image signal $e_1$. Therefore, as shown in FIG. 3C, there was a tendency in a recorded image for the block signals to be over-emphasized as compared with the original data.

Next, the operation for feeding the original in the auxiliary scanning direction will be described with reference to FIGS. 2, 4A and 4B. FIGS. 4A and 4B show a part of a recorded image which is read as an original by the reading device again, i.e., another part of the recorded image shown in FIG. 3A. In FIG. 4A, the vertical line 34 indicates an image data sampling point. A sampling signal for this sampling operation is outputted by the timing circuit 15 in FIG. 2. The sampling signal $e_{17}$ is outputted when N output pulses $e_A$ (N being a predetermined positive integer) have been counted with the reference pulse $e_Z$ as a reference.

At the start of the original reading operation, auxiliary scanning feed is carried out at 1/M regular scanning intervals (M being an positive integer), for instance at ¼ regular scanning intervals. As the reading window 33 scans along a main scanning line $l_1$, the original data read at the sampling point 34 is first "white", and therefore the signal $e_{13}$ held by the sample-and-hold circuit 6 is at a level $H_1$. After the auxiliary scanning feed has proceeded by ¼ of the regular scanning interval, the reading window 33 scans along a main scanning line $l_2$. In this case also, the original data read at the sampling point 34 is "white", and the signal $e_{13}$ is still at the level $H_1$.

When the reading window 33 scans along a main scanning line $l_3$ after the auxiliary scanning feed has been carried out through the same scanning interval, a part of the reference line 31 appears in the reading window 33. Accordingly, the level of the signal $e_{13}$ is decreased a little to $H_2$. Following this, the reading window 33 scans along a main scanning line $l_4$ after the auxiliary scanning feed has been carried out by ¼ of the regular scanning interval (hereinafter referred to as "a ¼ interval auxiliary scanning feed"). In this case, the level of the signal is further decreased to $H_3$. Similarly, when the reading windows 33 scans along main scanning lines $l_5$ through $l_8$, the level of the signal $e_{13}$ is changed to $H_4$, O, $H_3$ and $H_1$, respectively.

The signal $e_{13}$ is inputted to the difference circuit 7 (described below) which in turn outputs a signal $e_{14}$. As is apparent from the waveform of the signal $e_{14}$, at the time instant that the reading window 33 passes through the center of the reference line 31, the polarity of the signal $e_{14}$ is inverted. The waveform of the output $e_{15}$ of the half-wave rectifying and waveform shaping circuit 8 is such that the level is changed to an H (high) level from a 0 (zero) level substantially at the center of the reference line. The phase difference between the reading window and the original data is regarded as zero at this level change point, and the auxiliary scanning feed is returned from the 1/M interval auxiliary scanning feed to the regular scanning feed to read the original.

Figure 5:
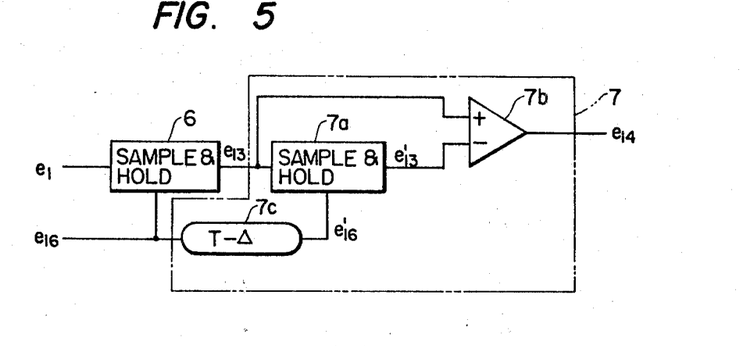
FIG. 5 is a block diagram showing an example of a difference circuit in FIG. 2.
Figure 6:
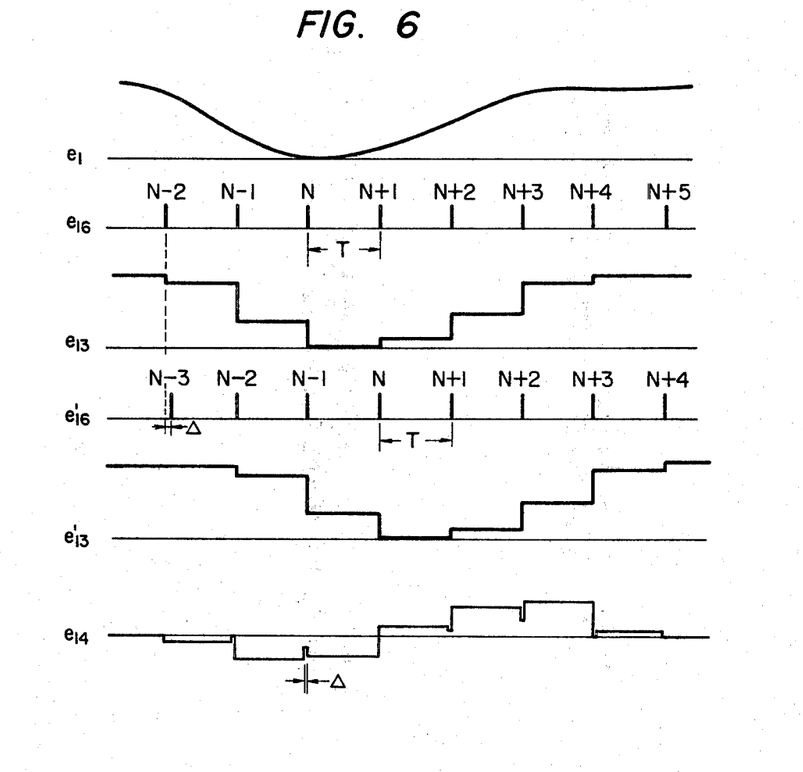
FIG. 6 is a waveform diagram showing the output signals of circuit elements in the difference circuit in FIG. 6.

A specific example of the difference circuit 7 is shown in FIG. 5. The waveforms of the outputs of various circuit elements in the difference circuit 7 are shown in FIG. 6.

The difference signal 7 is constructed of a sample-and-hold circuit 7a, a differential amplifier 7b and a delay line 7c. The analog image signal $e_1$ of the reference line 31 is sampled with the sampling signal $e_{16}$ provided by the timing circuit 15 in the sample-and-hold circit 6. The dealy line 7c delays the signal $e_{16}$ for a period of time $(T-\Delta)$ which is slightly shorter than the period T of the sampling signal $e_{16}$. The output waveform of the sample-and-hold circuit 7a is that of a signal $e_{13}'$, delayed with respect to the sampling signal $e_{16}$. The signals $e_{13}$ and $e_{13}'$ are applied to the differential amplifier 7b which in response thereto outputs a signal $e_{14}$. The dealy time of the delay line 7c is set to $(T-\Delta)$ because sampling of the signal $e_{13}$ with the signal $e_{16}'$ must be carried out immediately before the signal $e_{13}$ is changed by the signal $e_{16}$. Thus, the signal $e_{14}$ has gaps corresponding to the time $\Delta$. However, this causes no problem due to the subsequent processing of the signal.

Figure 7A:
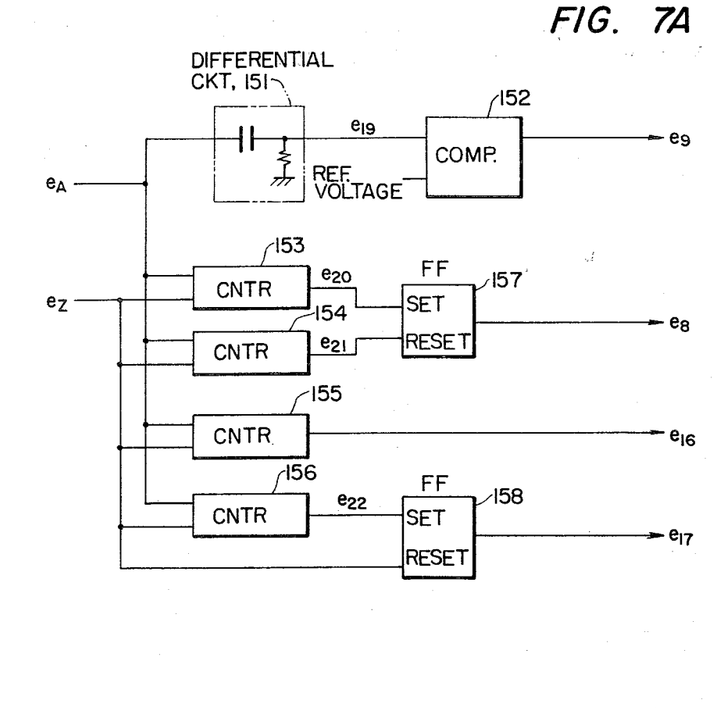
FIG. 7A is a block diagram showing a timing circuit 15 shown in FIG. 2 including a waveform diagram of various signals in the circuit.
Figure 7B:
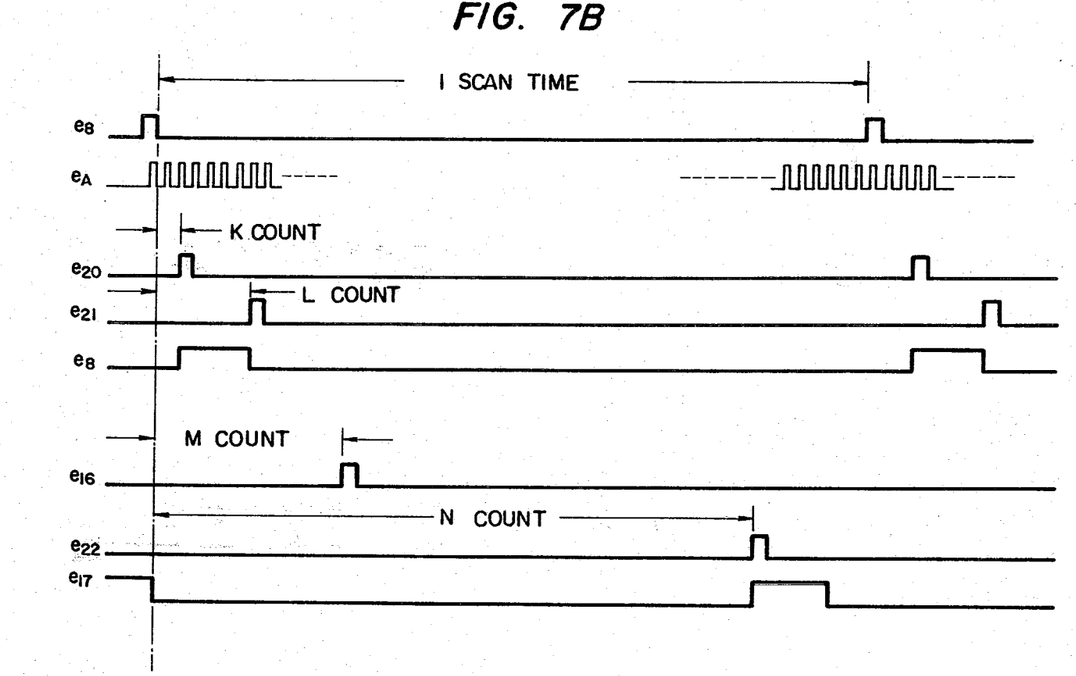
FIG. 7B is a timing chart showing a timed relation of various signals in the circuit shown in FIG. 7A.

The timing circuit 15 will be described in detail with reference to FIGS. 7A and 7B. The signal $e_A$ is applied to a differentiator circuit 151 to differentiate the same. The resultant signal $e_{19}$ is applied to a comparator 152 in which the signal $e_{19}$ is compared with a reference voltage. The comparison output, the signal $e_9$, is in turn applied to the sawtooth-wave generating circuit 16. The signal $e_A$ is further applied to counters 153-156 simultaneously to thereby effect the initial setting of the count numbers in the counters 153-156. The counters 153-156 effect counting of the signal $e_Z$ applied thereto. Assuming that the initially set count numbers in the counters 153-156 are K, L, M and N, respectively, the counters 153-156 produce signals $e_{20}$, $e_{21}$, $e_{16}$ and $e_{22}$, respectively, upon counting of the initially set count numbers (K, L, M, N).

A flip-flop 157 receives at its set terminal the signal $e_{20}$ and at its reset terminal the signal $e_{21}$ so that the flip-flop 157 is reset by the signal $e_{21}$ after being set by the signal $e_{20}$, thus providing the signal $e_8$ which is in turn applied to the AND gate 9. A flip-flop 158 receives at its set terminal the output signal $e_{22}$ of the counter 156 and at its reset terminal the signal $e_Z$. The flip-flop 158 is reset by the signal $e_Z$ after being set by the signal $e_{22}$, thus providing the signal $e_{17}$ which is in turn applied to the timing circuit 17.

Figure 8A:
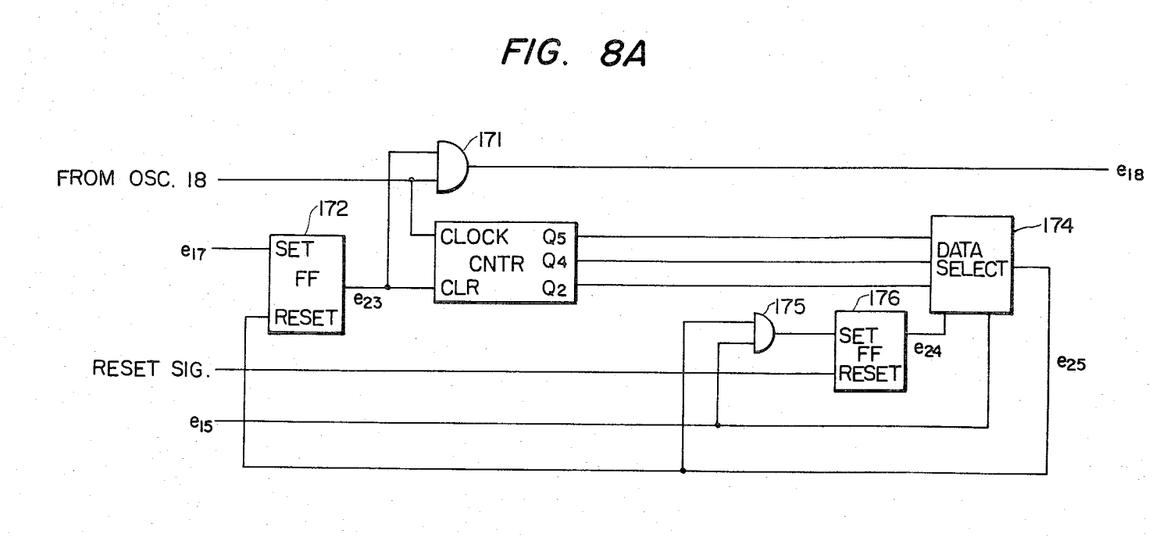
FIG. 8A is a block diagram showing a timing circuit 17 shown in FIG. 2.

Next, the timing circuit 17 will be described in detail with reference to FIGS. 8A and 8B. When the window of the reading device is not in phase with the line on the original, the signal $e_{15}$ is at the L level and a flip-flop 176 has been reset by a reset signal produced when the reading operation is started. Thus the signal $e_{24}$ is also at the L level. At this time, a data selector 174 operates to select the output $Q_2$ of a counter 173 and outputs the same as a signal $e_{25}$.

Figure 8B:
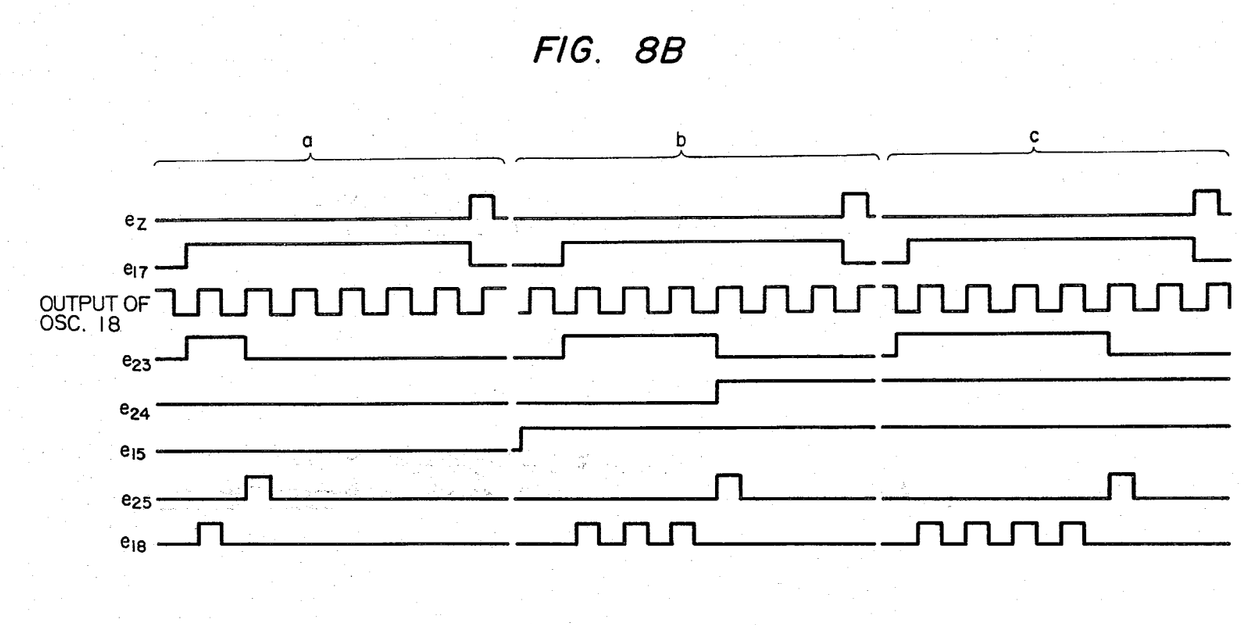
FIG. 8B is a timing chart showing timed relation of various signals in the circuit shown in FIG. 8A.

Referring to part a of FIG. 8B, a flip-flop 172 is set when the signal $e_{17}$ is applied to the set terminal thereof, and the signal $e_{23}$ goes to the H level. Then, the counter 173 starts counting the clock pulses delivered from the oscillator 18. When the counter 173 counts two clock pulses, the $Q_2$ output is supplied to the data selector 174. At this instant, the $Q_2$ output of the counter 173 is applied as the signal $e_{25}$ to the reset terminal of the flip-flop 172 to reset it. Since the output of the flip-flop 172 is coupled to one input of an AND gate 171 to the other input of which the clock pulses produced by the oscillator 18 are applied, the AND gate 171 is enabled to pass only one clock pulse therethrough, thereby providing the signal $e_{18}$.

When the reading window is substantially in phase with the line on the original, the signal $e_{15}$ becomes the H level. The output of the flip-flop 176 is maintained at the L level because it has not yet been set. At this time, the date selector operates to select the output $Q_4$ of the counter 173.

Referring to part b of FIG. 8B, when the signal $e_{17}$ becomes the H level, the flip-flop 172 is set to thereby cause the counter 173 to start counting. When the counting 173 counts four clock pulses, the $Q_4$ output is supplied to the data selector 174 and is outputted therefrom as the signal $e_{25}$. The signal $e_{25}$ resets the flip-flop 172 while setting the flip-flop 176. By the application of the signal $e_{23}$ to the AND gate 171, three clock pulses are allowed to pass therethrough, thereby providing the signal $e_{18}$.

Referring to part c of FIG. 8B, the signals $e_{15}$ and $e_{24}$ are both at the H level and the data selector 174 operates to select the $Q_5$ output of the counter 173. When the signal $e_{17}$ becomes the H level, the flip-flop 172 is set so that the counter 173 starts counting the clock pulses. When the counter 173 counts five clock pulses, the $Q_5$ otuput is supplied to the data selector 174 and the signal $e_{25}$ is applied to the reset terminal of the flip-flop 172 to reset the latter while setting the flip-flop 176. However, in this state, since the flip-flop 176 has been in the set condition, the signal $e_{24}$ is only maintained at H level. By the application of the signal $e_{23}$ to the AND gate 171, the AND gate 171 is enabled to pass four clock pulses therethrough, thereby providing the signal $e_{18}$. The above described operation is carried out repeatedly until one original page is read.

According to the invention, as described above, the recording device outputs a reference image together with original data to form a first recorded image, and on again reading the first recorded image as an original, the original data is read with the reading window set in phase with the reference image. Therefore, even if the image provided by the reading device is read again as an original and recording is carried out with the data thus read, the resultant recording image is still excellent in image quality.

What is claimed is:

1. An image reading device of a type wherein an analog image signal representing an image on an original is sampled to provide a binary electrical signal corresponding to a density distribution of the original, comprising:

a sampling pulse generating circuit for detecting a phase difference between a reference line provided on said original and a first sample pulse signal and outputting a second sampling pulse in phase with said reference line as a function of said detected phase difference;

an amplitude quantizing circuit for converting said analog image signal into a binary electrical signal; and a register receiving an output signal of said amplitude quantizing circuit and said sampling pulse signal for producing a sampled binary electrical signal such that, after said sampling pulse signal is in phase with said reference line on said original, said analog image signal is converted into said binary electrical signal.

2. The image reading device of claim 1 wherein said sampling pulse generating circuit comprises a low-pass filter receiving said analog image signal; a differentiator circuit receiving an output of said low-pass filter; a rectifier and waveshaping circuit receiving an output of said differentiator circuit; an AND gate receiving on a first input thereof and an output of said rectifier and waveshaping circuit; means for producing a reference signal in response to a reference pulse outputted by a rotary encoder utilized in scanning said original, said reference signal being coupled to a second input of said AND gate; means for generating a sawtooth-wave signal; a sample-and-hold circuit receiving as a sampled signal input an output of said sawtooth-wave signal and receiving an output of said AND gate as a sampling signal input; a comparator receiving an output of said sample-and-hold circuit on a first comparison input and said sawtooth-wave signal on a second comparison input thereof, said sampling pulse signal being produced as a comparison output from said comparator.

3. The image reading device of claim 1 further comprising means for feeding said original in an auxiliary scanning direction in such a manner that a reading window is maintained in phase with a reference image.

4. The image reading device of claim 3 wherein said means for feeding said original in said auxiliary scanning direction comprises a second sample-and-hold circuit having a sampling signal input coupled to receive said analog image signal; means for producing a sampling signal coupled to a sampling signal input of said second sample-and-hold circuit once for every predetermined number of output pulses produced by said rotary encoder; a difference circuit receiving a sampled signal from said second sample-and-hold circuit; a second rectifying and waveshaping circuit receiving an output of said difference circuit; and means for driving a pulse motor in response to an output of said second rectifying and waveshaping circuit.

5. The image reading device of claim 4 wherein said difference circuit comprises a third sample-and-hold circuit having a sampling input coupled to said output of said second sample-and-hold circuit; time delay circuit means having an input coupled to the sampling signal input of said second sample-and-hold circuit and an output coupled to a sampling signal input of said third sample-and-hold circuit; and a differential amplifier having a first input coupled to said output of said second sample-and-hold circuit and a second input coupled to an output of said third sample-and-hold circuit.

* * * * *